Patented July 12, 1938

2,123,206

UNITED STATES PATENT OFFICE 2,123,206

SYNTHETIC RESINS AND COMPOSITIONS CONTAINING THEM

Paul Robinson, Lansdowne, Pa., assignor to E. I. du Pont de Nemours & Company, Wilmington, Del., a corporation of Delaware No Drawing. Application June 13, 1929, Serial No. 370,727

9 Claims. (Cl. 260—8)

This invention relates to the art of plastics and coating compositions and, more particularly, to the production of synthetic resins and compositions containing them.

Synthetic resins have been made in a variety of ways, one of the most important of which is to react a polyhydric alcohol, such as glycerol, with a polybasic acid or its anhydride, such as phthalic anhydride, with or without modifying agents, such as monobasic acids, non-drying oils, or drying oil acids. While these methods have resulted in the production of useful resins, they have certain disadvantages, such as an undesirable darkening of the resulting product, a high cost, the variation of the resulting resin because of the non-uniformity of the drying oil acids available for use, and the impossibility of satisfactorily making long oil resins using Chinawood oil acids by prior methods.

Among the best synthetic resins heretofore produced, especially for use in coating compositions, are those in which the resin contains glycerides of drying oil acids, but such resins have been unduly dark owing to the necessity of introducing the drying oil in the form of drying oil acids in order to get a homogeneous product, especially if a sufficient amount of the oil was incorporated to produce a resin suitable for use in paint and varnish compositions.

I have discovered, however, that drying oils can be incorporated directly in any desired amounts by effecting the alcoholysis of the oil prior to esterification with polybasic acid. The resulting product is not only lighter in color and perfectly homogeneous, but may be obtained at a marked reduction in cost and dries much more rapidly than corresponding products made by the old method. These resins have been found to be superior for many purposes, such as in the production of coating compositions. They are also highly useful for other purposes, such as binders for granular or fibrous materials, laminated fabrics, molded plastics and safety glass.

It is therefore an object of this invention to provide a new method of making synthetic resins.

It is another object of this invention to produce new and useful resins.

It is a further object of this invention to produce new compositions containing my new resins.

With the above and other objects in view, which will be apparent as the description proceeds, I have set forth the following examples by way of illustration and not as a limitation.

Example 1

10.7 parts by weight of glycerol and 63.8 parts by weight of linseed oil are heated at 250° C. for 3½ hours in a varnish kettle provided with a reflux condenser. At this time the glycerol will have reacted with the oil sufficiently to form a mixture of glycerides, the two phases originally present having merged into a single phase. 25.4 parts by weight of phthalic anhydride are then added and heating is continued at the same temperature until an acid number below 5 is obtained, which is usually in about 19 hours. The resulting product is a straw-colored liquid of about the viscosity of molasses.

Example 2

The procedure of Example 1 is followed except that the upper portion of the varnish kettle is filled with carbon dioxide in order to exclude air from the reaction. Heating is continued until an acid number of 4 is obtained, which is in approximately 19 hours. The resulting product is a very pale straw-colored liquid which is slightly less viscous than the product of Example 1.

Example 3

10.7 parts by weight of glycerol and 63.8 parts by weight of linseed oil, in the presence of 0.75 part by weight of sodium glycerate catalyst, are heated at 250° C. for about 21 minutes in a varnish kettle provided with a reflux condenser. At this time the glycerol will have reacted with the oil sufficiently to form a mixture of glycerides. 25.4 parts by weight of phthalic anhydride are then added and heating is continued at the same temperature until an acid number below 5 is obtained, which is usually accomplished in about 19 hours. The resulting product is a straw-colored liquid of about the viscosity of molasses.

Example 4

6.4 parts by weight of glycerol and 78.6 parts by weight of China-wood oil are heated at 225° C. for 2 hours in a varnish kettle provided with a reflux condenser. At this time the glycerol will have reacted with the oil sufficiently to form a mixture of glycerides. 15.0 parts by weight of phthalic anhydride are then added and heating is continued at the same temperature until an acid number below 15 is obtained, which is usually in about 3½ hours. The resulting product is a straw-colored liquid of about the viscosity of molasses.

Example 5

15.70 parts by weight of glycerol, 22.77 parts by weight of linseed oil, and 22.77 parts by weight of China-wood oil are heated at 225° C. for 3 hours in the presence of 1.03 parts of sodium glycerate in a varnish kettle provided with a reflux condenser. At this time the glycerol will have reacted with the oil sufficiently to form a mixture of glycerides. 37.73 parts by weight of phthalic anhydride are then added and heating is continued at the same temperature until an acid number below 35 is obtained, which is usually in about 2½ hours. The resulting product is a light brown plastic solid.

Example 6

6.5 parts by weight of penta erythritol, 84 parts by weight of linseed oil and 1.9 parts by weight of sodium hydroxide are heated at 180° C. for 5½ hours in a varnish kettle provided with a reflux condenser. At this time the penta erythritol will have reacted with the oil sufficiently to form a mixture of glycerides. 7.6 parts by weight of phthalic anhydride are then added and heating is continued at 225° C. until an acid number below 7 is obtained, which is usually in about 3 hours. The resulting product is a light brown mobile liquid of a viscosity somewhat heavier than linseed oil.

Although the above examples are limited to the use of glycerol and penta erythritol, and to linseed and China-wood oils, I desire to have it understood that any other polyhydric alcohols containing more than two hydroxyl groups, which are used as resin ingredients, may be used, and any other drying oil or semi-drying oil may be substituted for linseed oil or China-wood oil. Similarly, mixtures of alcohols, including mixtures of alcohols having less than three hydroxyl groups in conjunction with alcohols having more than two hydroxyl groups, may be substituted for glycerol, and mixtures of drying and semi-drying oils may be used. Where mixtures of alcohols are used, they are all preferably added in the first stage. Where short oil resins are to be prepared, however, that is, those containing less than about 60% of glycerides of drying oil acids based on the total weight of the resin, the use of alcohols having more than three hydroxyl groups should be avoided, as it is difficult to prepare them by this process. Other polybasic acids or their anhydrides, such as succinic, tartaric, glutaric, camphoric and malic, or mixtures of acids, including mixtures of monobasic and polybasic acids, may be used in place of the phthalic anhydride. Where monobasic acids are used, they are preferably added in the second stage of the process. Similarly, any of the natural resins, such as Kauri and rosin, may be incorporated into my new resins, these materials being added in either stage of the process. Likewise, any other inert gas, such as nitrogen or flue gas, may be substituted for carbon dioxide.

Where an especially rapid reaction in the first stage is desired, this may be accomplished by using a catalyst, such as sodium glycerate, or sodium hydroxide, lime, or other inorganic basic materials. As indicated by a comparison of Examples 1 and 3, sodium glycerate caused the reaction to take place 10 times as rapidly.

The resins made in accordance with the invention disclosed herein may be used in the production of a wide variety of compositions, illustrative examples of which are set forth below:

Example 7.—Varnish

If 100 parts by weight of the resin of Example 5 is thinned to brushing viscosity by the addition of 100 parts by weight of turpentine, and one part by weight of cobalt linoleate is added, the resulting material is a varnish adapted for finishing woodwork.

Example 8.—Outside paint

An outside paint of unusual durability and excellent appearance can be made by combining the following ingredients according to the common practice used in making paints:

| | Parts by weight |
|---|---|
| Saranac green | 42.22 |
| Asbestine | 10.96 |
| Zinc oxide | 4.39 |
| Resin of Example 2 | 28.72 |
| Turpentine | 11.95 |
| Lead and manganese drier | 1.76 |
| | 100.00 |

Example 9.—Lacquer

A pigmented lacquer can be made from the following ingredients by combining them in the usual manner:

| | Parts by weight |
|---|---|
| Titanox | 26.4 |
| Resin of Example 1 | 9.1 |
| Nitrocellulose (low viscosity) | 4.3 |
| Dibutyl phthalate | 4.4 |
| Butyl acetate | 14.5 |
| Ethyl alcohol | 5.9 |
| Butyl alcohol | 4.0 |
| Toluol | 5.0 |
| Low flash naphtha | 25.5 |
| Cobalt drier | 0.9 |
| | 100.00 |

Example 10.—Molded plastic 50 parts by weight of the resin of Example 5 and 50 parts by weight of wood flour are mixed on steam heated differential rolls and the material so obtained is molded by the use of heat and pressure into the desired products.

My experiments have shown that by the use of this new process it is possible to obtain resins which are very much lighter in color, and which dry in considerably less time than those prepared by the old method, giving much harder films without the loss of any of the other desirable properties, and the resulting resins are therefore markedly superior to those heretofore obtainable.

It will therefore be apparent that I have produced new synthetic resins and a new method of making them, and that these resins are useful in the production of a wide range of products, such as coating compositions, binders for granular or fibrous materials, laminated fabrics, molded plastics and safety glass.

Succinic, tartaric, glutaric, camphoric and malic acids, which are mentioned above as examples of other polybasic acids, or their anhydrides, than phthalic, which may be used in accordance with the teaching of the present invention, are examples of carboxylic acids which are known in the prior art including Arsem 1,098,776. The present applicant's invention does not reside in the use of these five specific acids which were added to this application by amendment, although they are of course covered by, and are within the scope of, applicant's generic claims.

As many apparently widely different embodiments of this invention may be made without departing from the spirit and scope thereof, it is to be understood that I do not limit myself to the specific embodiments thereof except as defined in the appended patent claims.

I claim:

1. The process of preparing synthetic resins which comprises the alcoholysis of oils of the drying or semi-drying type with a polyhydric alcohol in the presence of an inorganic basic catalytic material, and the esterification of the resulting product with a polybasic carboxylic acid.

2. The process of preparing synthetic resins which comprises the alcoholysis of oils of the drying or semi-drying type with a polyhydric alcohol in the presence of sodium hydroxide, and the esterification of the resulting product with a polybasic carboxylic acid.

3. The process of preparing synthetic resins which comprises the alcoholysis of oils of the drying or semi-drying type with a polyhydric alcohol in the presence of lime, and the esterification of the resulting product with a polybasic carboxylic acid.

4. A plastic composition comprising a resinous condensation product of a polybasic carboxylic acid and the reaction product of a polyhydric alcohol having more than two hydroxyl groups and an oil of the group which consists of drying oils and semi-drying oils.

5. The process which comprises combining a mixture of polyhydric alcohols with an oil having drying properties, adding a polybasic organic acid to the combination and esterifying the entire mass.

6. The process which comprises combining a polyhydric alcohol with an oil having drying properties, adding a mixture comprising polybasic organic acid and monobasic organic acid to the combination and esterifying the entire mass.

7. The process which comprises combining a polyhydric alcohol with a drying oil, adding a mixture comprising polybasic organic acid and monobasic organic acid to the combination and esterifying the entire mass.

8. The process which comprises combining a polyhydric alcohol with a mixture comprising drying and semi-drying oils, adding a mixture comprising polybasic organic acid and monobasic organic acid to the combination and esterifying the entire mass.

9. The process which comprises combining a mixture of polyhydric alcohols with a mixture comprising drying and semi-drying oils, adding a mixture comprising polybasic organic acid and monobasic organic acid to the combination and esterifying the entire mass.

PAUL ROBINSON.